United States Patent [19]
Braeger et al.

[11] Patent Number: 5,394,589
[45] Date of Patent: Mar. 7, 1995

[54] CASTER FOR ISOLATING SHOCK AND VIBRATION LOADS

[75] Inventors: Denise M. Braeger, Erie; James T. Gwinn, Fairview; Richard P. Thorn, Erie, all of Pa.; Richard S. Gureghian, Burlington, Mass.

[73] Assignee: Lord Corporation, Erie, Pa.

[21] Appl. No.: 16,375

[22] Filed: Feb. 11, 1993

[51] Int. Cl.⁶ .................................................. B60B 33/00
[52] U.S. Cl. ............................................................ 16/44
[58] Field of Search ................................... 16/44, 18 R

[56] References Cited
U.S. PATENT DOCUMENTS

| | | | |
|---|---|---|---|
| 180,477 | 8/1876 | Helling | 16/44 |
| 523,801 | 7/1894 | Vegiard | 16/44 |
| 594,017 | 11/1897 | Hunt . | |
| 1,745,992 | 2/1930 | Herold | 16/44 |
| 2,885,720 | 5/1959 | Seeberger | 16/44 |
| 3,072,169 | 12/1959 | Hastings, Jr. | 152/41 |
| 3,183,544 | 5/1965 | Bailey | 16/18 |
| 3,194,293 | 7/1965 | Kindley | 152/327 |
| 4,318,204 | 3/1982 | Black | 16/46 |
| 4,649,595 | 3/1987 | Shane | 16/18 |
| 4,685,174 | 8/1987 | Hager | 16/44 |
| 4,709,444 | 12/1987 | Black | 16/31 A |
| 5,031,269 | 7/1991 | Lautenschläger | 16/45 |

Primary Examiner—P. Austin Bradley
Assistant Examiner—Chuck Y. Mah
Attorney, Agent, or Firm—Richard K. Thomson; Randall S. Wayland; James W. Wright

[57] ABSTRACT

Three embodiments of a shock-isolating caster. A surface-effect damper engages at least one of a wheel element and an intermediate structural member to dampen vibration and shock loads which would otherwise be transmitted from the wheel element through the intermediate structure and mounting member to the equipment supporting cart. A first embodiment positions the damper between an outer wheel rim and an inner wheel hub. Second and third embodiments mount the wheel on a pivotable arm and dampen the movement of the arm. Capability to adjust damping levels is provided.

21 Claims, 6 Drawing Sheets

CASTER FOR ISOLATING SHOCK AND VIBRATION LOADS

FIELD OF THE INVENTION

The present invention relates to the field of casters. More particularly, the invention is directed to several embodiments of casters capable of isolating shock and vibration loads.

BACKGROUND AND SUMMARY OF THE INVENTION

Carts, tables, casters directly mounted to the frame, and other means are used to support/transport computers and other delicate electronic equipment. The performance of such equipment can be degraded by vibration during usage and shock loads experienced during transport on such carts, and both can produce various degrees of damage to the equipment.

Previous attempts to develop a shock-isolating caster have met with limited success. This is due, in part, to the rigorous demands placed on such casters, since each may experience static loads in excess of 1,000 pounds each and shock loads of 100 times the static weight load. Further, a number of these attempts employing elastomer to isolate rely upon the elastomer to dissipate energy in shear. U.S. Pat. No. 3,072,169 issued to Hastings, Jr. and U.S. Pat. No. 3,194,293 issued to Kindley are two such caster designs which rely upon elastomeric shear to isolate shock loads. The shear action produces hysteresis damping which dissipates the vibration or shock load energy as heat. In both of these caster configurations, the engineer must trade off competing design criteria. For optimal stability, the elastomer should be as hard as possible. However, in order to provide the desired isolation characteristics, a low modulus (soft), highly damped elastomer must be used.

In the caster designs of the present invention, surface-effect damping, which has both hysteresis and friction components, is used. The addition of friction damping to hysteresis damping affords much higher levels of energy dissipation while permitting the use of lower modulus elastomers. This unlinks, to some extent, the competing design characteristics of stability and isolation and allows the designer greater leeway in selecting an elastomer that will satisfy both requirements.

The present invention is a shock-isolating caster comprising a ground-engaging wheel element; a mounting member for securement to a base assembly to be isolated from shock and vibration loads; intermediate structure positioned between said ground-engaging wheel element and said mounting member; a surface-effect elastomeric damper engaging at least a surface portion of one of said wheel element and said intermediate means, said surface-effect elastomeric damper producing both frictional and hysteresis damping forces upon said surface portion which it engages to dampen transmission of vibration and shock loads to said base assembly from said wheel element.

In a first embodiment, the intermediate means comprises a bracket attached to the mounting member, an axle supported by the bracket, which axle extends through a friction-reducing bearing that receives the wheel element. In this embodiment, the elastomeric damper reacts between an outer wheel element and an inner wheel element to damp transmission of shock and vibration loads from the wheel to the base assembly to which the caster is attached.

In a second and third embodiment, the wheel element is secured to one end of an elongated pivot arm and the elastomeric damper engages the pivot arm (the intermediate means) and not the wheel. In the second embodiment, the pivot arm is a length of spring steel and the damper comprises a saddle support with elastomeric members bonded to inwardly directed, opposing lateral surfaces. The elastomeric members are engaged by lateral faces of the spring arm which produces hysteresis and friction damping of relative movement between wheel and base assembly. The third embodiment positions the damper between the saddle support bracket and a C-shaped mounting arm with an upper rib on the arm, which arm is pivotally mounted to the support bracket, a damper positioned between the ends of the bracket and the arm which are distal from pivot, the rib on the arm being engaged in a recess in the damper to provide friction and hysteresis damping.

Various other features, advantages and characteristics will become apparent after a reading of the following Detailed Description of the Preferred Embodiments.

BRIEF DESCRIPTION OF THE DRAWINGS

In the accompanying drawings, like reference numerals have been used to indicate like elements and, in which.

DETAILED DESCRIPTION OF THE PREFERRED EMBODIMENTS

Figure 1:
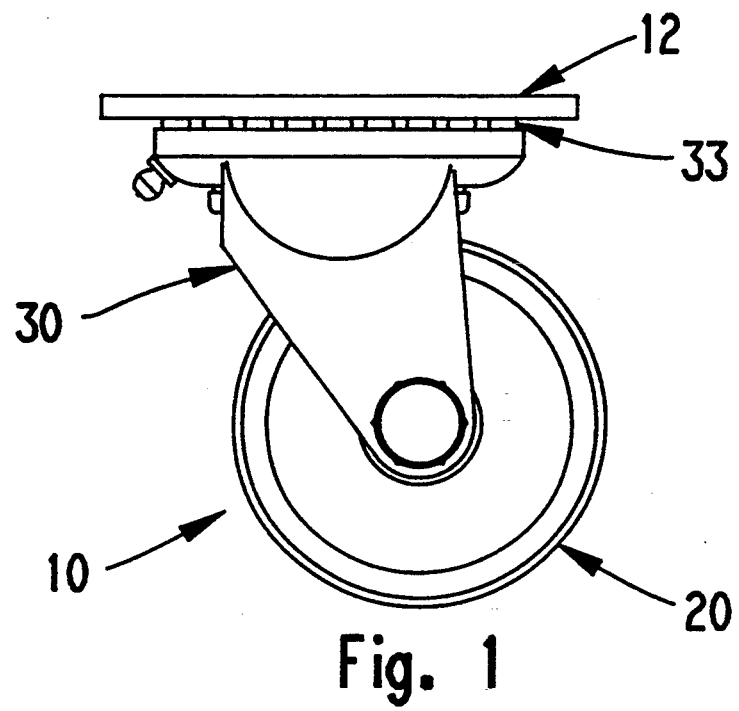
FIG. 1 is a side view of a first embodiment of the shock-isolating caster of the present invention.
Figure 2A:
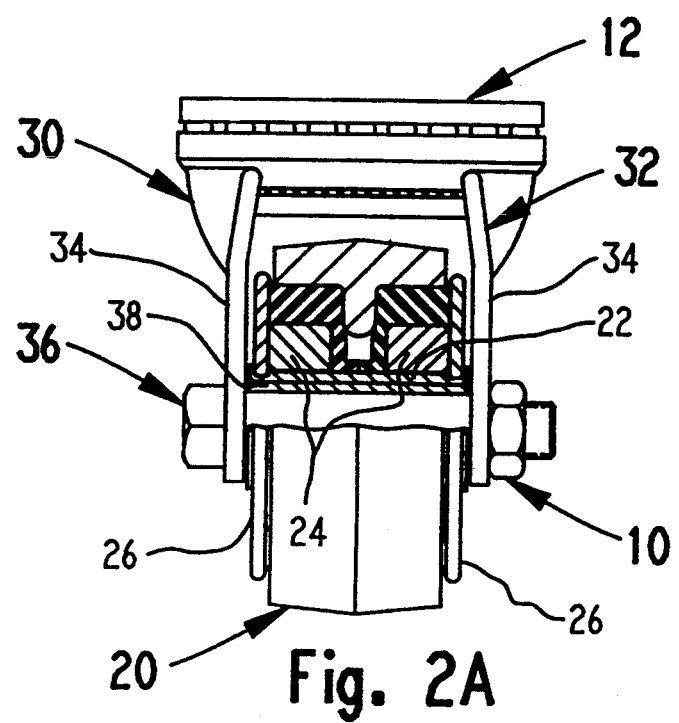
FIG. 2A is a front view in partial section of the first embodiment.
Figure 2B:
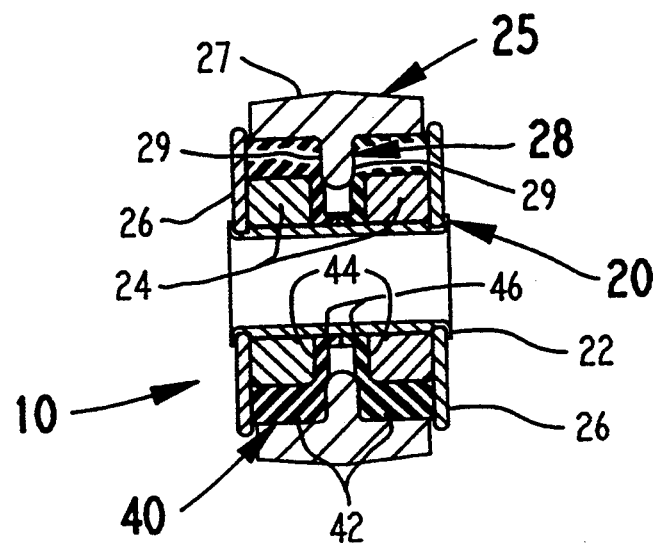
FIG. 2B is a front sectional view of the wheel element of the first embodiment.
Figure 3:
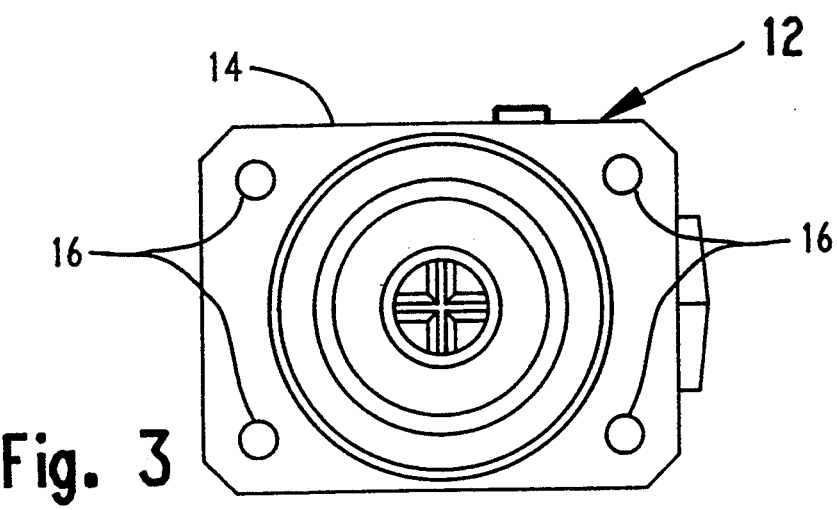
FIG. 3 is a top view of the first embodiment.
Figure 4:
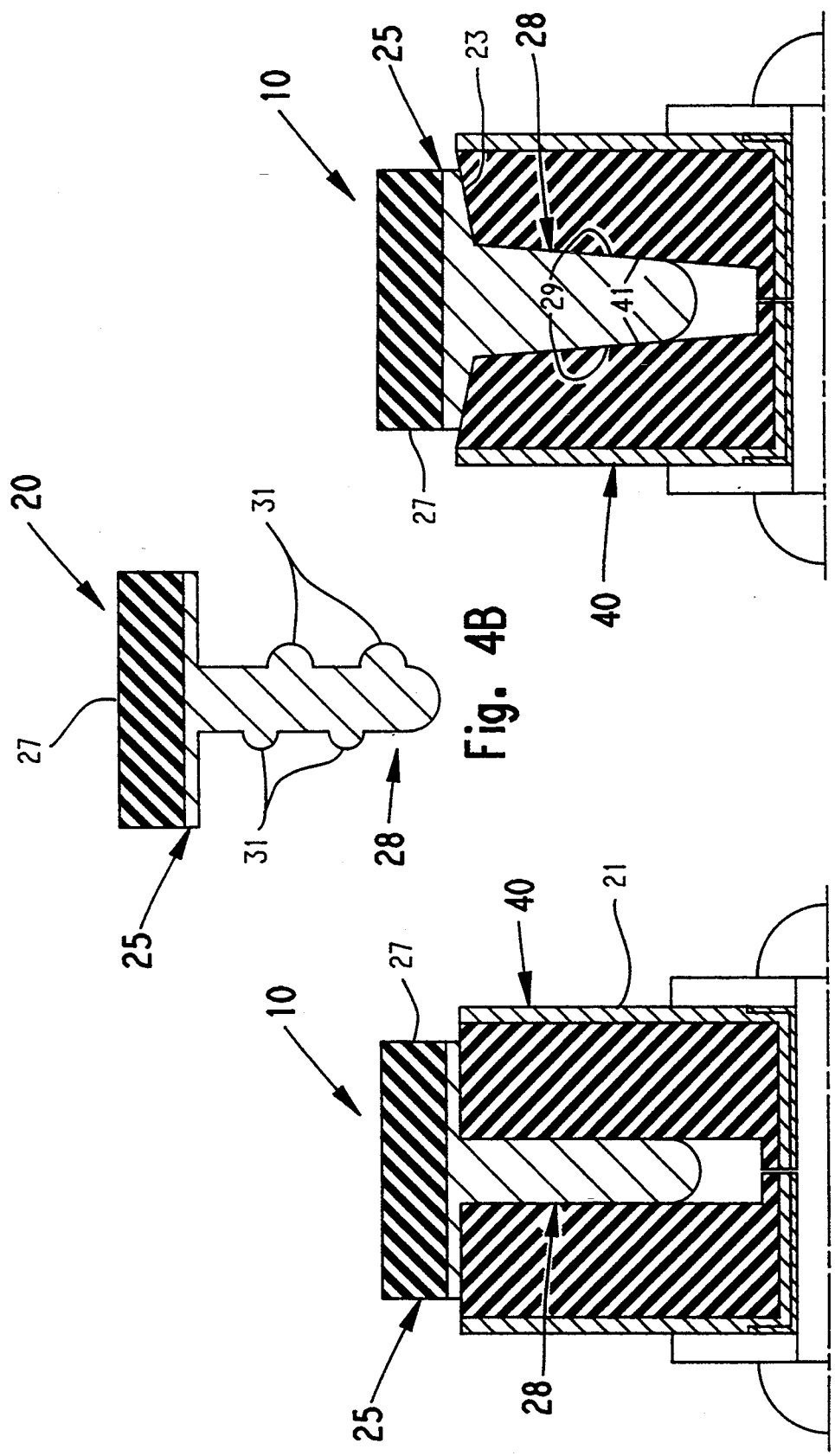
FIG. 4A is a partial schematic front view of a variant of the first embodiment.
FIG. 4B is a partial schematic front sectional view of a rim of a second variant.
FIG. 4C is a partial schematic front view in section of a third variant of the first embodiment.

A first preferred embodiment of the shock-isolating caster of the present invention is shown in FIGS. 1–3, with variants being shown in FIGS. 4A–C, generally at 10. Caster 10 includes a ground-engaging wheel element 20, a mounting member 12 for securing caster 10 to a base assembly (not shown) to be isolated from shock and vibration loads, and intermediate structure 30 for interconnecting wheel 20 to mounting member 12. An elastomeric element 40 provides static and dynamic load-supporting capacity as well providing surface-effect damping of vibration and shock loads, the surface-effect damping having both hysteresis and friction components. Because of its predominant importance as a damper, element 40 will be referred to as a damper throughout the balance of this description. The characteristics and advantages of surface effect damping have been fully detailed in copending U.S. patent application Ser. No. 07/812,192 filed Dec. 20, 1991, now U.S. Pat. No. 5,257,680, which is hereby incorporated by reference. In this embodiment, element 40 is internalized within the wheel reacting between inner wheel elements 22, 24 and outer wheel element 25.

Mounting member 12 includes generally rectangular mounting plate 14 which has four apertures 16 positioned at the corners. Apertures 16 receive conventional bolt assemblies (not shown) which secure four casters 10 to a base assembly, such as a component cart. As best seen in FIG. 2B, wheel element 20 comprises an inner cylindrical element 22, two spacer elements 24 and washers 26 attached to inner element 22 as by crimping. Preferably each of these elements 22, 24 and 26 is made of steel.

Outer wheel element or rim 25 has outer ground-engaging tread 27 and an inwardly directed protrusion or surface-effect engaging element 28. Outer wheel element is preferably made of an impact resistant polymer such as nylon. Surface-effect damper 40 comprises two annular elastomeric sections 42 overlying spacers 24 and two inwardly extending flanges 44. Short annular elastomeric hub portions 46 extend along the outside of cylinder 22 and cushion the snubbing of projection 28 there against. Flanges 44 engage lateral faces 29 of projection 28 providing frictional damping to augment the hysteresis damping which occurs primarily as outer wheel element 25 squeezes sections 42 against spacers 24 and as projection 28 moves between flanges 44. It is preferred that elastomeric damper 40 be closely confined by surrounding structure but remain totally unbonded to the surfaces it contacts for maximum damping. Washers 26 prevent sections 42 from being merely squeezed laterally outwardly and, with the appropriate choice of a highly damped elastomer, provide the desired level of damping. The elastomer for this application preferably has a shear modulus lying in the range from about 40 to 100 psi. In this and each of the embodiments described herein, the optimum performance is achieved when the surface characteristics of the elastomer have been physically and/or chemically modified, as by a coating, lubricant or plasma treatment to minimize abrasion.

Intermediate structure 30 includes a bracket 32 rotatably attached to mounting member 12 by bearing 33. Bracket 32 has a pair of arms 34 which receive a bolt assembly 36 which serves as an axle for wheel element 20. A friction-reducing bearing 38 is positioned between bolt 36 and cylinder 22 of wheel element 20. This bearing may be of any friction-reducing material desired, such as a glass-filled nylon.

Figure 9:
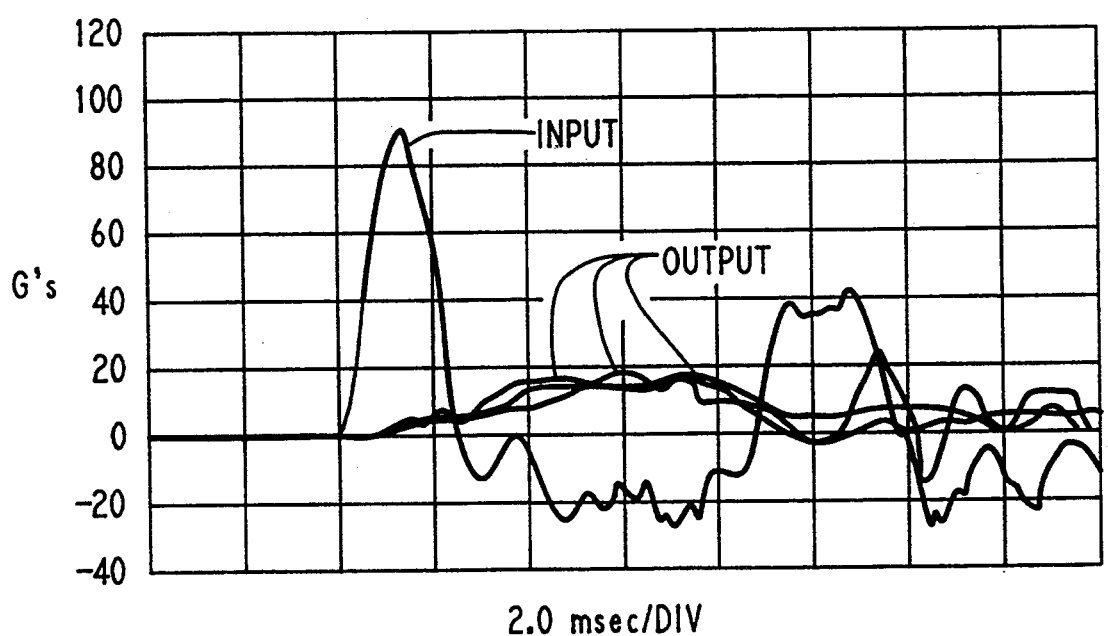
FIG. 9 is a plot of acceleration vs. time for a test mount equipped with casters of the present invention.

Casters constructed in accordance with the precepts of this embodiment were tested by an independent testing agent. Four casters 10 are attached to a load of 1,274 pounds with the load being intentionally distributed unevenly. The test rig is then positioned upon a plate that lifts the rig to a desired height and then rapidly withdraws support. The net effect is a dropping of the rig from a particular height and both the impact resistance and shock-isolation characteristics of the caster can be tested. FIG. 9 depicts the output plot of the rig when dropped from a height of three inches. The dark line depicts the acceleration experienced by the assembly (nearly 90 times the acceleration of gravity) while the other three channels of the plotter reflect the accelerations experienced immediately adjacent three of the four casters (the equipment only has four channels). In spite of the load imbalance, caster 10 consistently reduced the shock loads by 65–85%.

Variations of this first caster embodiment are shown in FIGS. 4A–C. FIG. 4A schematically depicts an outer wheel element 25 in which the inner member including surface-effect projection 28 is made of aluminum and tread portion 27 is an elastomer. The radially inner wheel portion 21 is depicted as a single element having a U-shaped cross section which houses damper 40.

FIG. 4B depicts a second variation in which the lateral faces 29 of surface-effect engagement member 28 have protrusions 31 to increase the forces generated in and on the surface of the elastomeric damper 40. These protrusions 31 may be configured as hemispherical or semi-ovoid surface bumps or as annular ribs. This variant may be utilized where increased damping of uniform magnitude is desired.

FIG. 4C depicts a third variant in which the lateral faces 29 of flange 28 are tapered in conjunction with lateral faces 41 of damper 40. Also, underneath surface 23 of rim 25 and the outer face of damper 40 have complementary tapered surfaces. As projection 28 effectively wedges into elastomeric damper 40 as a result of increasing vibration or shock loads, the damping force will increase non-linearly.

Figure 5:
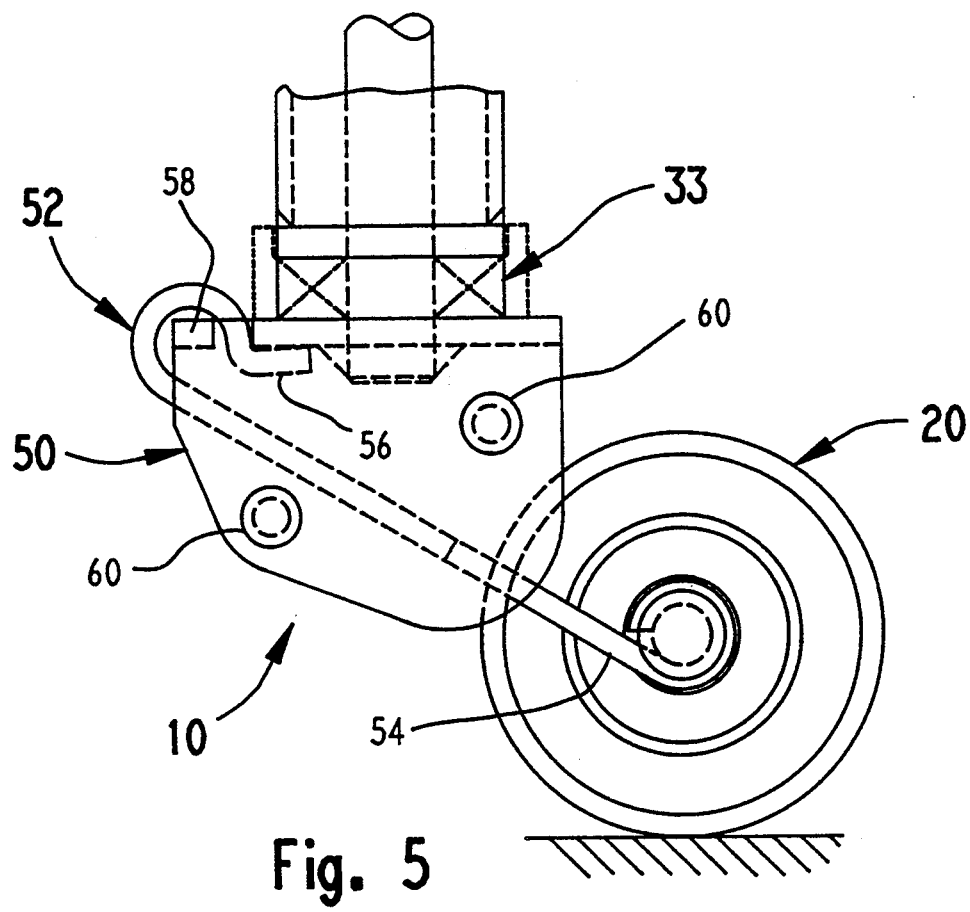
FIG. 5 is a schematic side view of a second embodiment of the shock-isolating caster of the present invention.
Figure 6:
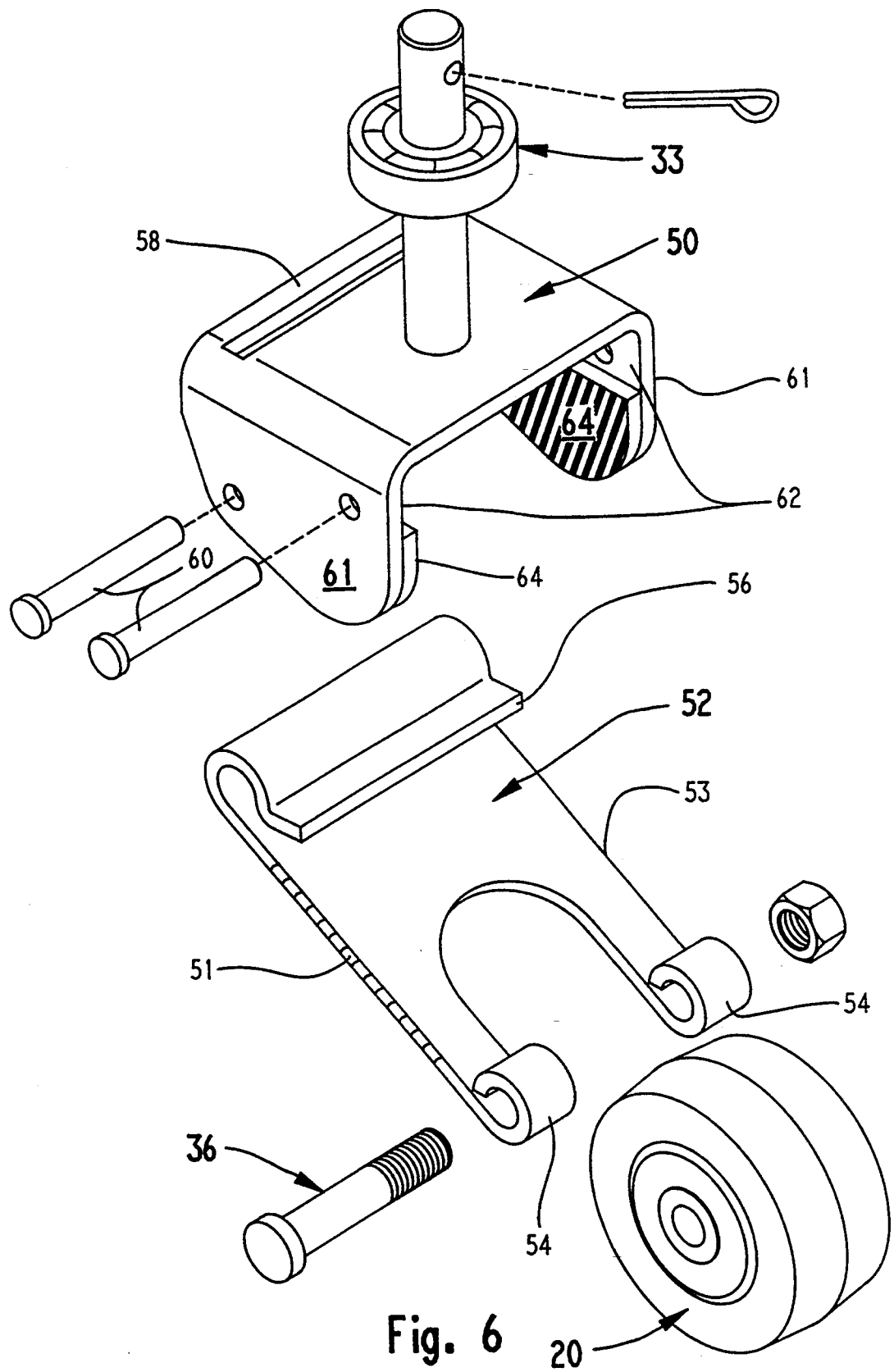
FIG. 6 is an exploded isometric view of the second embodiment.

A second embodiment of the caster 10 of the present invention is shown in FIGS. 5 and 6. In this embodiment, intermediate structure 30 includes a C-shaped saddle bracket 50 with downwardly directed legs 61 and a pivotable arm 52, made preferably of spring steel. First end 54 of arm 52 mounts wheel element 20 while second end 56 encircles pivot axle 58. Pins 60 provide limits of motion for arm 52. Internal surfaces 62 of saddle bracket legs 61 have elastomer portions 64 bonded thereto. Elastomer portions 64 will engage lateral faces 51 and 53 of arm 52 and movement of arm 52 will experience both hysteresis and friction damping. Second end 56 of arm 52 will exert a restorative spring force opposing the loading of the arm, as will the restorative springiness of the entire length of arms 52, as the load distributes itself throughout its length.

Figure 7:
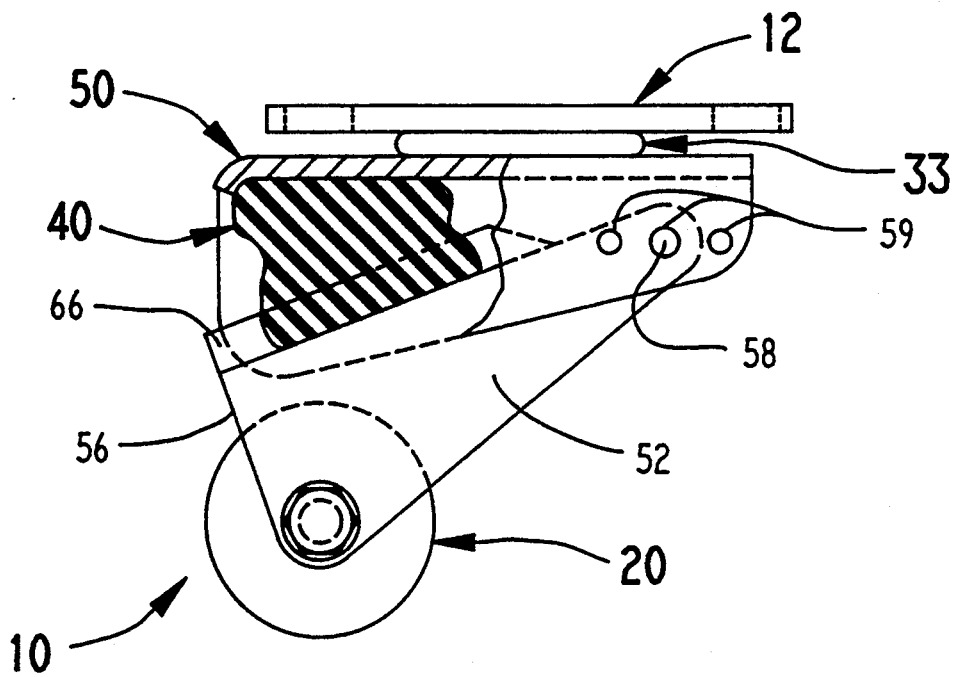
FIG. 7 is a schematic side view of a third embodiment with portions broken away.
Figure 8:
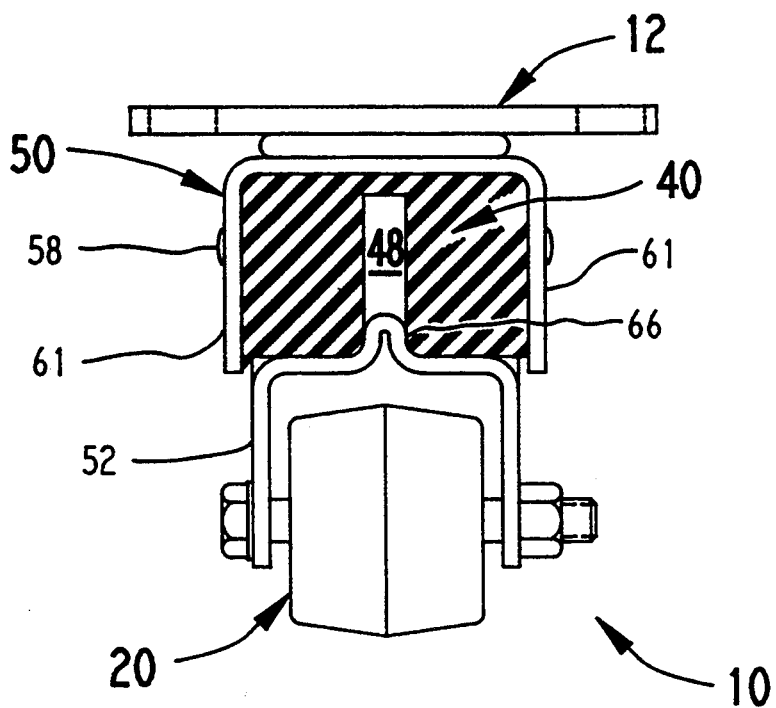
FIG. 8 is a front view of the third embodiment.

A third embodiment of caster 10 is depicted in FIGS. 7 and 8. In this embodiment, C-shaped saddle bracket 50 has mounted thereto an elongated arm 52 by pivot hinge 58. Second end 56 of arm 52 mounts wheel element 20 by axle bolt 36. As can be seen in FIG. 8, second end 56 can rotationally compress elastomeric spring 40 within saddle bracket 50 to carry static and dynamic loads. Ends 41 and 43 of elastomeric spring element 40 can be sculpted to enhance the desired bulging of elastomer in this region. Element 40 provides the elastomeric member of a surface-effect damper. Elongated arm 52 has a longitudinal rib 66 formed along a major portion of its upper surface. The width of rib 66 may preferably taper some 5° from one end to the other. Rib 66 is received in recess 48 in element 40 and serves to add a frictional/hysteresis damping component to the load carrying features of the elastomeric spring 40. Elastomeric spring 40 may be bonded along a central stripe portion of its upper surface to bracket 50 to prevent its removal from the assembly. However, the preponderance of the edge portions of element 40 should remain unbonded for optimal performance.

Hinge 58 can be received in any of three pairs of openings 59 in legs 61 permit the damping force provided by element 40 to be adjusted. Note, the force would vary simply by virtue of repositioning the damper within nutcracker-like configuration of bracket 50 and arm 52. The variation in damping will be enhanced by the tapering of rib 66 discussed above.

The shock-isolating caster 10 can be used to protect sensitive electronic equipment from vibration (including HVAC induced vibration and tremors) and shock loads. The damper 40 of the present invention provides surface-effect damping, that is, damping that has both a hysteresis and a frictional component. Accordingly, lower modulus elastomers can be used for equivalent damping improving stability of the caster. Note, the configurations of the caster surrounding the damper which confine the elastomer, further enhance stability. These casters have shown extraordinary ability to reduce transmitted shock loads by amounts as high as 65-85%.

Various changes, alternatives and modifications will become apparent to a person of ordinary skill in the art following a reading of the foregoing description. It is intended that all such changes, alternatives and modifications as some within the scope of the appended claims be considered part of the present invention.

What is claimed is:

1. A shock-isolating caster comprising
   a) a ground-engaging wheel element having generally vertically extending surfaces;
   b) a mounting member for securement to a base assembly to be isolated from shock and vibration loads;
   c) intermediate structure positioned between said ground-engaging wheel element and said mounting member to interconnect said wheel element to said mounting member, said intermediate structure having generally vertically extending surfaces;
   d) a surface-effect elastomeric damper including an elastomeric member and restraining means preventing movement of said elastomeric member laterally, said damper engaging at least a surface portion of said generally vertically extending surfaces of at least one of said wheel element and said intermediate structure;
   said surface-effect elastomeric damper producing both frictional and hysteresis damping forces upon said surface portion which it engages as a result of relative movement between said surface portion and said damper to dampen transmission of vibration to said base assembly from said wheel element.

2. The shock-isolating caster of claim 1 wherein said elastomeric damper is incorporated into said wheel element reacting between a first radially outer wheel portion and a radially inner wheel portion.

3. The shock-isolating caster of claim 2 wherein said intermediate structure comprises a bracket attached to said mounting member, an axle received in said bracket extending through said wheel element and a friction-reducing bearing.

4. The shock-isolating caster of claim 3 wherein said first radially outer wheel portion comprises a rim element having a tread formed thereon, said rim element having a surface-effect engaging member radially inward therefrom which is received in a recess formed in said elastomeric damper.

5. The shock-isolating caster of claim 4 wherein said surface-effect engaging member has incorporated thereupon force enhancing means for increasing a surface-effect force created therebetween with respect to said elastomeric damper.

6. The shock-isolating caster of claim 5 wherein said force enhancing means comprises tapered lateral faces for non-linearly increasing said surface-effect force.

7. The shock-isolating caster of claim 5 wherein said force enhancing means comprises a plurality of protrusions extending outwardly from lateral faces of said surface-effect engaging member.

8. The shock-isolating caster of claim 1 wherein said intermediate structure comprises an elongated arm mounting said wheel element at one first end and pivoting about a second end of said elongated arm.

9. The shock-isolating caster of claim 8 wherein said elongated arm comprises a length of spring steel flexing throughout its length which extends from said second end about which pivoting occurs to said first end which mounts said wheel element.

10. The shock-isolating caster of claim 9 further comprising a C-shaped saddle bracket wherein opposing inwardly directed surfaces of said saddle bracket have bonded thereto elastomeric members which engage lateral faces of said elongated arm exerting hysteresis and frictional damping thereon.

11. The shock-isolating caster of claim 8 wherein said elongated arm comprises a C-shaped support which receives an axle mounting said wheel element.

12. The shock-isolating caster of claim 11 in which a first one end of said elongated arm is pivotally mounted to a C-shaped bracket such that a second free end of said elongated arm may pivotally collapse toward said bracket.

13. The shock-isolating caster of claim 12 wherein said bracket comprises a portion of said intermediate structure and said elastomeric damper engages an upper surface of said elongated arm and a lower surface of said bracket thereby limiting the amount of pivotal movement.

14. The shock-isolating caster of claim 13 wherein said upper surface of said elongated arm and said lower surface of said bracket compress said elastomeric damper in nutcracker fashion.

15. The shock-isolating caster of claim 14 wherein said elongated arm includes a longitudinal rib protruding from an upper surface thereof which is frictionally received within a recess in said elastomeric damper.

16. The shock-isolating caster of claim 12 wherein said C-shaped bracket includes multiple mounting points from which to pivotally mount said elongated arm in order to vary the magnitude of said surface-effect damping by increasing or decreasing an area of said surface portion in contact with said damper.

17. The shock-isolating caster of claim 1 wherein said elastomeric damper is made of a material having a hardness of from about 40 to 100 durometer.

18. The shock-isolating caster of claim 1 further comprising means to adjust a magnitude of at least one of said hysteresis and frictional forces generated by said elastomeric damper.

19. The shock-isolating caster of claim 1 wherein an elastomer making up said elastomeric surface-effect damper is subjected to a surface modifying treatment.

20. A shock-damping caster comprising
   a) a ground-engaging wheel having generally vertically extending surfaces;
   b) a support base to be isolated from shock and vibration;

c) intermediate structure connecting said wheel to said base, said intermediate structure including an elongated arm having a first end mounting said wheel and a second end which is pivotal about a laterally extending hinge, said elongated arm having generally vertically extending lateral surfaces;

d) elastomeric damper means engaging at least one of said generally vertically extending lateral surfaces of said elongated arm to produce a damping force to dampen transmission of shock and vibration from said wheel to said base;

e) means to adjust a magnitude of said damping force created by said damper means by increasing or decreasing an area of said at least one generally vertically extending lateral surface in contact with said damper means.

21. The shock-damping caster of claim 20 wherein said elastomeric damper means comprises a surface effect damper capable of producing a damping force having both hysteresis and frictional components and said means to adjust said damping force increases or decreases both the hysteresis and frictional components.

* * * * *